United States Patent [19]
Bond

[11] Patent Number: 5,411,147
[45] Date of Patent: May 2, 1995

[54] DYNAMIC LANDFILL RECYCLING SYSTEM

[76] Inventor: David S. Bond, 615 Twin Brooks Way, Marietta, Ga. 30067

[21] Appl. No.: 10,663
[22] Filed: Jan. 28, 1993
[51] Int. Cl.6 .............................................. B07C 3/04
[52] U.S. Cl. ................................... 209/44.4; 209/636; 209/630; 209/631; 209/638; 209/705; 209/930; 209/910; 209/920; 209/935; 414/489; 414/502; 414/528
[58] Field of Search ............... 209/2, 3, 219, 228, 209/229, 630, 631, 638, 705, 707, 910, 914, 920, 930, 935, 44.4, 636; 414/489, 502, 528

[56] References Cited

U.S. PATENT DOCUMENTS

| | | | |
|---|---|---|---|
| 930,853 | 8/1909 | Franks et al. | 209/910 X |
| 3,216,567 | 11/1965 | Kelley et al. | 209/920 X |
| 3,291,305 | 12/1966 | Tenpas et al. | 209/219 |
| 3,557,685 | 1/1971 | Schroering | 100/39 |
| 3,595,389 | 7/1971 | Morgan | 209/125 |
| 3,650,396 | 3/1972 | Gillespie et al. | 209/930 X |
| 3,749,240 | 7/1973 | Spears et al. | 209/631 |
| 3,809,239 | 5/1974 | Barrett et al. | 209/111.8 |
| 3,888,351 | 6/1975 | Wilson | 209/75 |
| 3,892,658 | 7/1975 | Benowitz | 209/219 X |
| 3,926,792 | 12/1975 | Buford | 209/219 X |
| 3,973,736 | 8/1976 | Nilsson | 209/3 X |
| 4,069,146 | 1/1978 | Sommer, Jr. et al. | 209/930 X |
| 4,084,496 | 4/1978 | Ehernberger et al. | 209/935 X |
| 4,245,999 | 1/1981 | Reiniger | 44/1 D |
| 4,254,878 | 3/1981 | Marsh | 209/920 X |
| 4,459,206 | 7/1984 | Laithwaite | 209/3 |
| 4,479,581 | 10/1984 | Kelyman, Jr. | 209/3 |
| 4,541,530 | 9/1985 | Kenny et al. | 209/930 X |
| 4,553,977 | 11/1985 | Fry | 44/1 D |
| 4,760,925 | 8/1988 | Stehle et al. | 209/616 |
| 4,929,342 | 5/1990 | Johnston | 209/12 |
| 4,967,912 | 11/1990 | Schonberg | 209/228 X |
| 5,009,370 | 4/1991 | Mackenzie | 241/24 |
| 5,060,870 | 10/1991 | Trezek et al. | 241/19 |
| 5,092,986 | 3/1992 | Feistner et al. | 209/219 X |
| 5,100,537 | 3/1992 | Krause | 209/935 X |
| 5,101,977 | 4/1992 | Roman | 209/3 |
| 5,101,980 | 4/1992 | Arvidson | 209/219 X |
| 5,116,486 | 5/1992 | Pederson | 209/12 |
| 5,156,749 | 10/1992 | Williams | 209/404 X |
| 5,203,665 | 4/1993 | Lande | 414/528 X |
| 5,205,417 | 4/1993 | Herren | 209/603 |

Primary Examiner—James R. Bidwell
Assistant Examiner—Carol L. Druzbick
Attorney, Agent, or Firm—James A. Hinkle

[57] ABSTRACT

A dynamic landfill recycling system has wheels attachable to a plurality of refuse processing sections in one or more semi-trailer or other vehicular units. A refuse receiving section has a dump bed or one or more vehicular refuse bins to accept new refuse from refuse trucks or optionally to accept old refuse from old refuse sites for processing, A primary conveyor belt is slanted upwardly towards a vibratory feeder. The primary conveyor is rotated rapidly to throw the refuse in an arc onto the vibratory feeder where the throwing action causes the refuse to spread out as it falls. The vibratory feeder is slanted downwardly at an angle which causes vibrated refuse to fall towards a bottom end and a bag cutter that is positioned above and intermediately between ends of the vibratory feeder to further expose and scatter the refuse on the vibratory feeder. A magnetic separator belt conveys the scattered refuse upwardly to a magnetic pulley wheel which separates ferrous from non-ferrous materials. A recycling conveyor belt then conveys the remaining refuse through an optionally human and/or robotic separating which sorts all recyclable materials and positions them in separate container and transportation devices.

46 Claims, 7 Drawing Sheets

DYNAMIC LANDFILL RECYCLING SYSTEM

BACKGROUND OF THE INVENTION

I. Field of the Invention

The present invention relates generally to the field of garbage sorting machinery and methods. More particularly, it is a mobile garbage recycling system with rapid sorting means that can be moved wherever its operation is most advantageous at a landfill site or moved to different landfill sites.

II. Description of the Prior Art

Studies indicate that the general public does not sort their garbage thoroughly or accurately enough to be reliable for recycling and landfill uses. Whether garbage, referred to generally as municipal solid waste and abbreviated as MSW, is discarded in bags or loose in refuse bins, it still must be resorted. The cost of resorting public sorted MSW is nearly as great as though it had not been sorted. Even if sorted accurately and thoroughly by the general public, more human time and costs are required for the consumer public to sort their MSW than for sorting it with this invention. Economically, therefore, it is more advantageous to charge the consumer public for having their garbage sorted for recycling and landfilling than to impose this burden on them. In addition, the MSW sorted with this invention can be sold at higher prices for recycling, for landfill, for fertilizer and in some cases, for fuel. Use of this invention can achieve benefit to our environment and eliminate MSW disposal costs to the public.

A variety of MSW sorting equipment and systems have been devised. None, however, have been efficient enough to render MSW sorting for recovery at a landfill or dump site more economical than for the consumer public to sort it and deposit it in separate bags for municipal collection. One problem with previous MSW recovery equipment has been its fixed site construction. Another problem has been the requirement to transport MSW various distances from portions of sites to the stationary equipment for reworking old dump sites. Another problem has been low efficiency of the sorting means. For example, a solid waste sorting method described in U.S. Pat. No. 5,101,977 issued to W. C. Roman on Apr. 7, 1992 required use of expensive equipment which would fill a large two-story building. Different from this invention, the machinery it described could not be transported to different landfill sites. It was not mobile. A steeply inclined conveyor belt had vertically upstanding "flites", presumably prong-like or hook-like appendages, which allowed selective passage of objects between them for a sorting function. A screened trammel provided additional size sorting. Further different from this invention, its methods employed steps which included use of the flites and use of air separation. U.S Pat. No. 5,116,486, granted to D. A. Pederson on May 26, 1992 also described a waste separator that was expensive because it was large and stationary, rather than mobile and economical as taught by this invention. All other known waste sorting equipment and methods also are stationary rather than portable and mobile in a manner taught by this invention.

SUMMARY OF THE INVENTION

In accordance with the present invention, it is contemplated that one object of this invention is to provide a dynamic landfill recycling system which is transportable to positions of greatest advantage for receiving unprocessed solid waste and discharging it as processed solid waste where desired in relation to a particular landfill site.

Another object is to provide a dynamic landfill recycling system which has mobility from one landfill site to another.

Another object is to provide a dynamic landfill recycling system which is highly efficient, accurate and thorough in recovering at least the following materials from raw municipal refuse:
A. Paper
 (1) Corrugated paper
 (2) Newspaper
 (3) High-grade paper
B. Glass
 (1) Green glass
 (2) Brown glass
 (3) Clear glass
C. Plastic
 (1) High density polyethylene
 (2) Low density polyethylene
 (3) Polyethylene terephthalate
 (4) Polyvinyl chloride
 (5) Polypropylene
 (6) Polystyrene
D. Aluminum
E. Ferrous metals
F. Organic materials for fertilizer and fuel
G. Landfill materials Another object is to provide a dynamic landfill recycling system which can recover the above materials either directly from refuse trucks or from old refuse dump sites with comparable efficiency, accuracy and thoroughness.

Yet another object of this invention is to provide a dynamic landfill recycling system which enables use of refuse processing facilities which are independent of landfill sites. Landfill portions of processed refuse can be transported to landfill sites after being separated from recyclable and otherwise useable refuse. Such refuse processing facilities can be positioned nearer populated or industrial areas to decrease further the costs of processing refuse with this invention. MSW facilities can be temporary and portable to meet expansion requirements of communities and to achieve landfill objectives of real estate development with the mobility and efficiency provided by this invention.

Societal objects of this invention are to reduce or eliminate garbage disposal costs to the general public and to improve the environment with MSW.

This invention accomplishes the above and other objectives with a dynamic landfill recycling system having wheels attachable to a plurality of refuse processing sections in one or more semi-trailer or other vehicular units. A refuse receiving section has a dump bed or one or more vehicular refuse bins to accept new refuse from refuse trucks or optionally to accept old refuse from old refuse sites for processing. A primary conveyor belt is slanted upwardly towards a vibratory feeder. The primary conveyor is rotated rapidly to throw the refuse in an arc onto the vibratory feeder where the throwing action causes the refuse to spread out as it falls. The vibratory feeder is slanted downwardly at an angle which causes vibrated refuse to fall towards a bottom end and a bag cutter that is positioned above and intermediately between ends of the vibratory feeder to further expose and scatter the refuse on the vibratory feeder. A magnetic separator belt conveys the scattered refuse upwardly to a magnetic pulley wheel which separates ferrous from non-ferrous materials. A recycling conveyor belt then conveys the remaining refuse through an optionally human and/or robotic separating means which sorts all recyclable materials and positions them in separate container and transportation means. A magnetic repulsion means sorts out aluminum items and particles. Organic and nonrecyclable materials are collected at the end of the recycling conveyor belt for fuel, fertilizer and landfill uses.

Other objects, advantages and capabilities of the invention will become apparent from the following description taken in conjunction with the accompanying drawings showing preferred embodiments of the invention.

DESCRIPTION OF THE PREFERRED EMBODIMENTS

Figure 1:
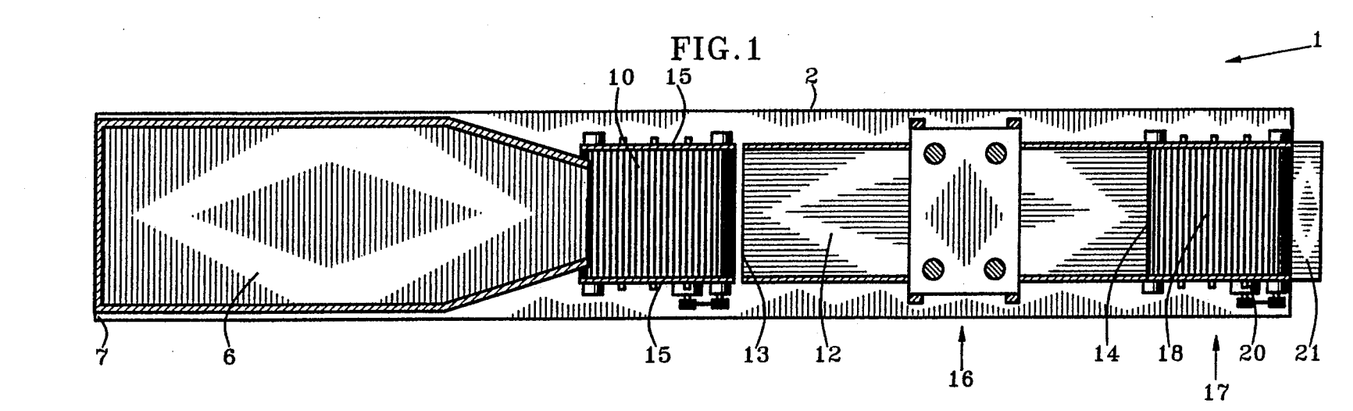
FIG. 1 is a top view of a receiving end of a multiple vehicle embodiment of this invention.
Figure 2:
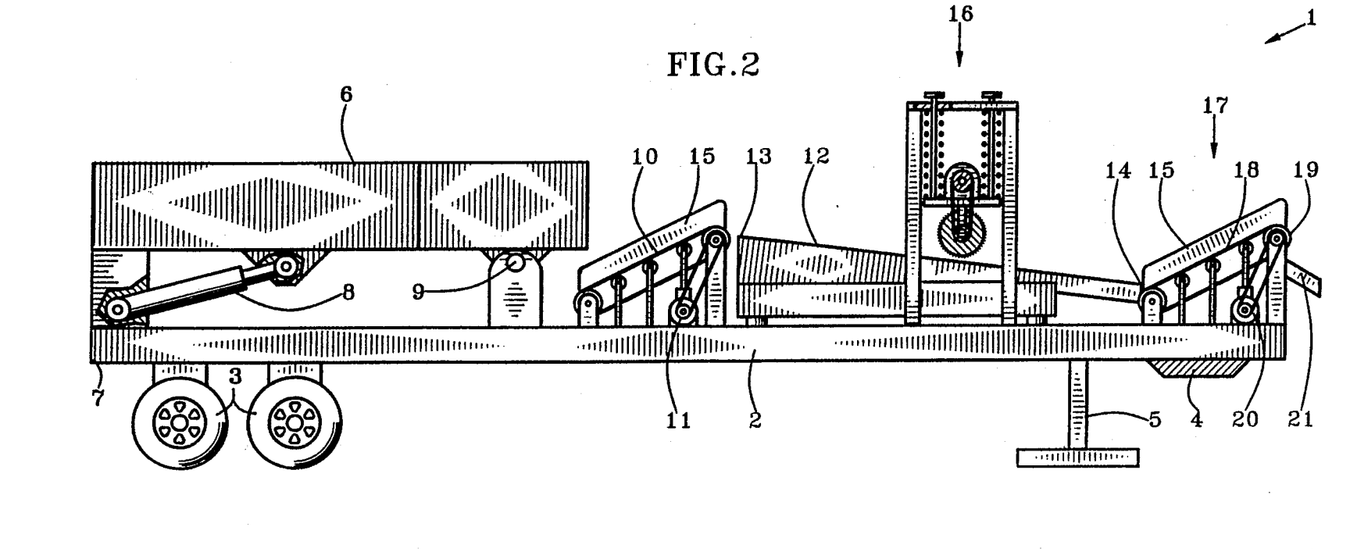
FIG. 2 is a side elevation view of the FIG. 1 embodiment.

Referring to the drawings wherein like reference numerals designate corresponding parts throughout the several figures, reference is made first to FIGS. 1 and 2 showing a first vehicular unit 1 of a solid waste processing platform 2 having wheels 3. A fifth wheel 4 and a leveling jack 5 can be provided to render the solid waste processing platform 2 mobile and positioned like a semitrailer. A dump bed 6 can be attached pivotally to a receiving end 7 of the solid waste processing platform 2. A hydraulic or other mechanical lifter 8 can be provided to tilt the dump bed 6 on pivot axle 9 for dumping refuse from the dump bed 6 onto a solid waste receiving conveyor 10. The dump bed 6 and the solid waste receiving conveyor 10 are referred to collectively as a solid waste receiving means in this embodiment of the invention.

The solid waste receiving conveyor 10 is rotated fast enough by receiving conveyor motor 11 to throw refuse arcuately onto a solid waste feeder 12. The solid waste feeder 12 can be a downwardly slanted vibrator on which refuse is spread as it is caused to fall from a top end 13 to a bottom end 14 by slant in combination with vibration of the vibrator. A conveyor wall 15 at each side of the solid waste receiving conveyor 10 can be provided to prevent refuse from falling off the sides of the solid waste receiving conveyor 10.

A bag cutter 16 is positioned above solid waste feeder 12 intermediate ends 13 and 14. The bag cutter 16 cuts garbage bags and further disperses refuse on the solid waste feeder 12.

From the solid waste feeder 12, refuse is deposited onto a ferrous metal separator 17. The ferrous metal separator 17 can have a ferrous separation conveyor belt 18 that is slanted upwardly. The ferrous separation conveyor belt 18 is positioned on a cylindrical magnetic pulley wheel 19 at a top end. The ferrous separation conveyor belt 18 is rotated fast enough by a separation belt motor 20 to throw non-metallic waste arcuately from the top end while allowing ferrous metal items to remain in contact with the top end of the ferrous separation conveyor belt 18 by magnetic attraction of the magnetic pulley wheel 19. As the ferrous separation conveyor belt 18 rounds the magnetic pulley wheel 19 and starts a downward travel to a bottom end, ferrous metal items are pulled away from the magnetic pulley wheel 19 and drop onto ferrous collection means 21.

Figures 3, 4:
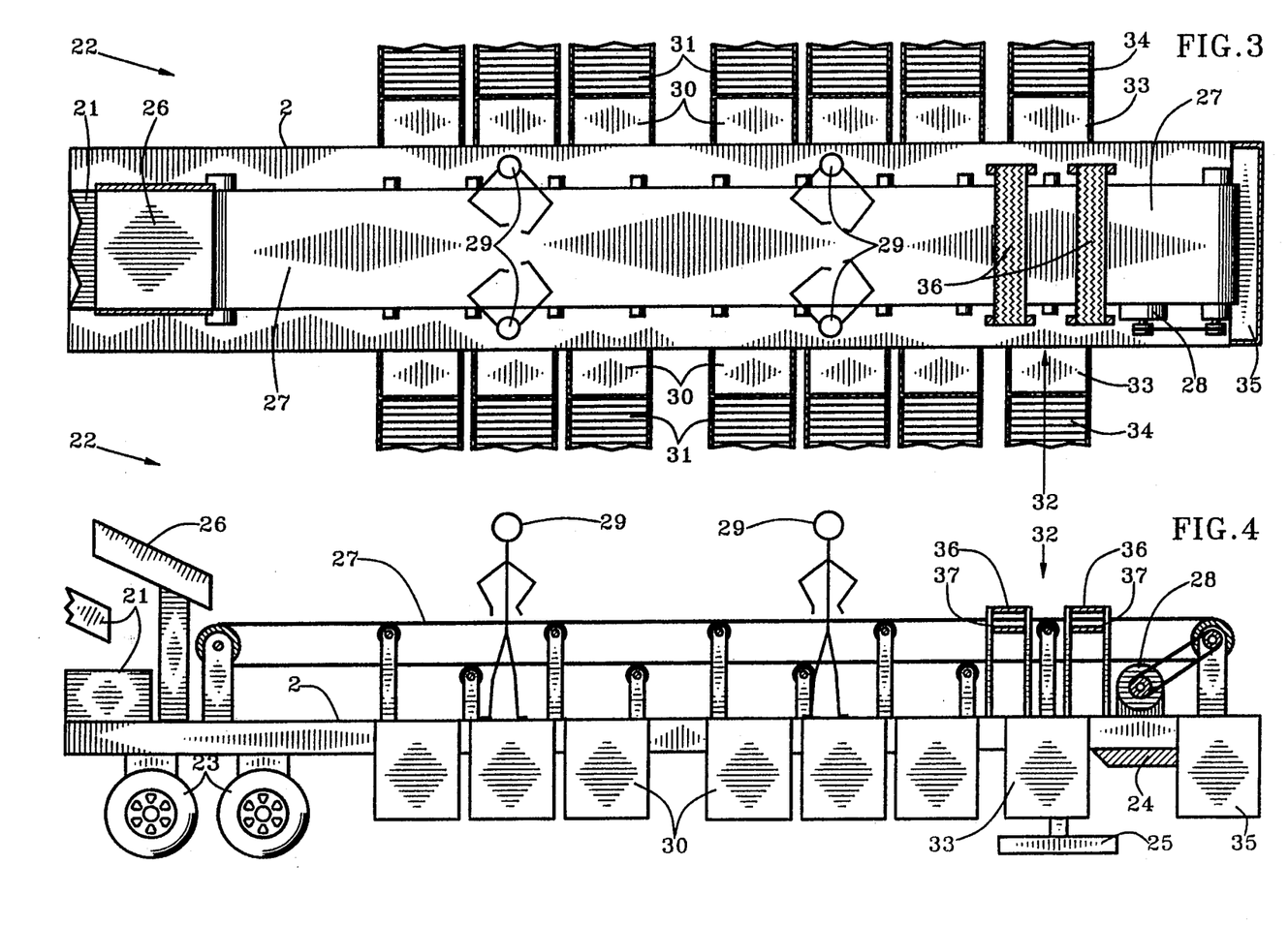
FIG. 3 is a top view of a processing end of the FIG. 1 embodiment.
FIG. 4 is a side elevation view of the FIG. 3 illustration.

Reference is made now to FIGS. 3 and 4. A second vehicular unit 22 of the solid waste processing platform 2 has wheels 23. A separate fifth wheel 24 and leveling jack 25 can be provided to render this second vehicular unit 22 of the solid waste processing platform 2 mobile and positioned like a semitrailer the same as the first vehicular unit 1. The second vehicular unit 22 is positioned end to end in front of the first vehicular unit 1 to form a continuous solid waste processing platform 2.

The second vehicular unit 22 is a processing portion of the solid waste processing platform 2 in this embodiment. The ferrous collection means 21 can start as a first step of processing on the first vehicular unit 1 as described in relation to FIG. 1 and continue as shown on the second vehicular unit 22. A walled chute 26 can be provided to guide refuse thrown from the ferrous separation conveyor belt 18, described in relation to FIG. 1, onto a recycling conveyor in the form of a conveyor belt 27. The conveyor belt 27 is rotated by a processing motor 28 to position refuse in proximity to a sorting means.

The sorting means can include at least one sorting worker 29 at each side of the conveyor belt 27. Two sorting workers 29 are shown at each side of the conveyor belt 27, making a total of four sorting workers 29, for typical operation with this form of the invention. Refuse receptacles 30 are positioned at sides of the conveyor belt 27 to receive particular types of waste sorted out by the sorting workers 29. Leading from refuse receptacles 30 can be refuse conveyances 31 to containerize or otherwise to render sorted refuse portable for recycling objectives. As appropriate for particular operations and locations with particular mixes of municipal solid waste, the refuse receptacles 30 and refuse conveyances 31 can be structured and positioned as appropriate for receiving separately either paper of various types, glass of various colors and plastic of various types. Ferrous items will have been processed out before the refuse is placed on the conveyor belt 27. Aluminum can be sorted out with a magnetic aluminum separator 32 proximate the processing motor 28 and placed in aluminum receptacles 33 and aluminum conveyors 34. Refuse remaining on the conveyor belt 27 after the aluminum separator 32 will be mostly organic materials and various forms of dirt that can be used for fertilizer, fuel and landfill, depending on its nature and depending on desired objectives. Such refuse remaining after the aluminum separator 32 can be positioned in such landfill receptacles 35 as desired.

One type of aluminum separator 32 that can be used employs magnetic repulsion to levitate aluminum items into the aluminum receptacles 33. At least one top magnet 36 is positioned a desired distance vertically above and at least one bottom magnet 37 is positioned a desired distance vertically below the conveyor belt 27. Polarity of the top magnet 36 adjacent to the conveyor belt 27 is directed towards an opposite side of the conveyor belt 27 from polarity of the bottom magnet 37. Magnetism can be provided by electrical current as appropriate. This causes conductors such as aluminum items to function like a solenoid with its north pole pointing towards a north pole of an applied field. Aluminum with its higher conductivity per mass will be propelled with repulsive magnetic force easier and, therefore, quicker than heavier materials per level of conductivity such as iron, silver and gold. This is an application of Faraday's law of magnetic induction in combination with Lenz's law, Lorentz force and other principles of Physics. Aluminum items can be repulsed magnetically to one side of the conveyor belt 27 with one half of a first set of magnets 36 and 37 and to the opposite side of the conveyor belt 27 with an opposite one half of a second set of magnets 36 and 37. Additional sets of magnets can be employed successively for more complete processing of aluminum, iron, silver and gold items as desired.

Figure 5:
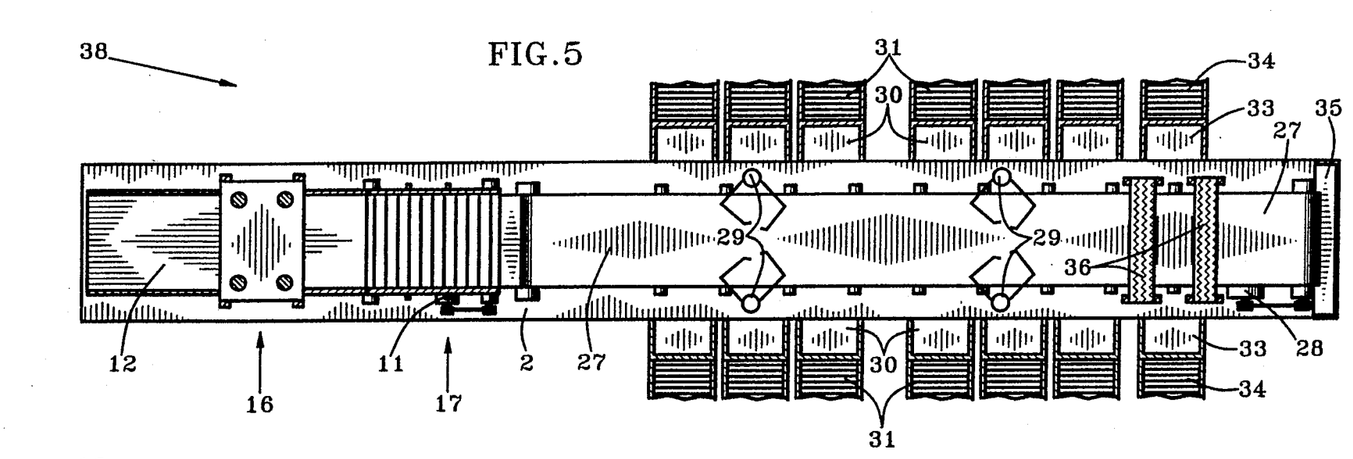
FIG. 5 is a top view of a single vehicle embodiment.
Figure 6:
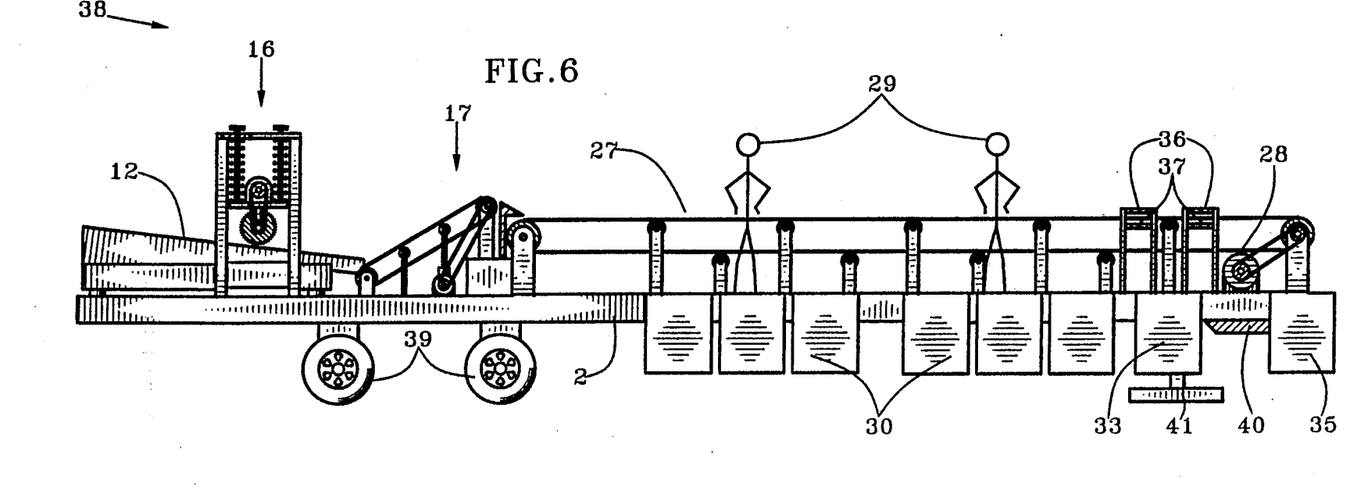
FIG. 6 is a side elevation view of the FIG. 5 embodiment without side conveyors.

Referring to FIGS. 5 and 6, a single vehicular unit 38 of a solid waste processing platform 2 can have wheels 39, fifth wheel 40 and leveling jack 41. The single vehicular unit 38 can be a semitrailer up to 60 feet long in comparison to 45 or 48 feet long for multiple vehicular units described in relation to FIGS. 1-4. For a 60 foot trailer, wheels 39 can be positioned more centrally and farther apart for highway maneuverability. Special moving permits are required for moving trailers longer than 48 feet in most states. But such permits are easy to obtain for commercial purposes and are common for moving long and wide house trailers.

A receiving means can be provided separately from this single vehicular unit 38 in order to include equal distances on the solid waste processing platform 2 for a solid waste feeder 12, a bag cutter 16, a ferrous metal separator 17, a conveyor belt 27 and related processing means. All components have a working relationship that is the same for single vehicular units 38 as for multiple vehicular units described in relation to FIGS. 1-4.

Figures 7, 8, 9:
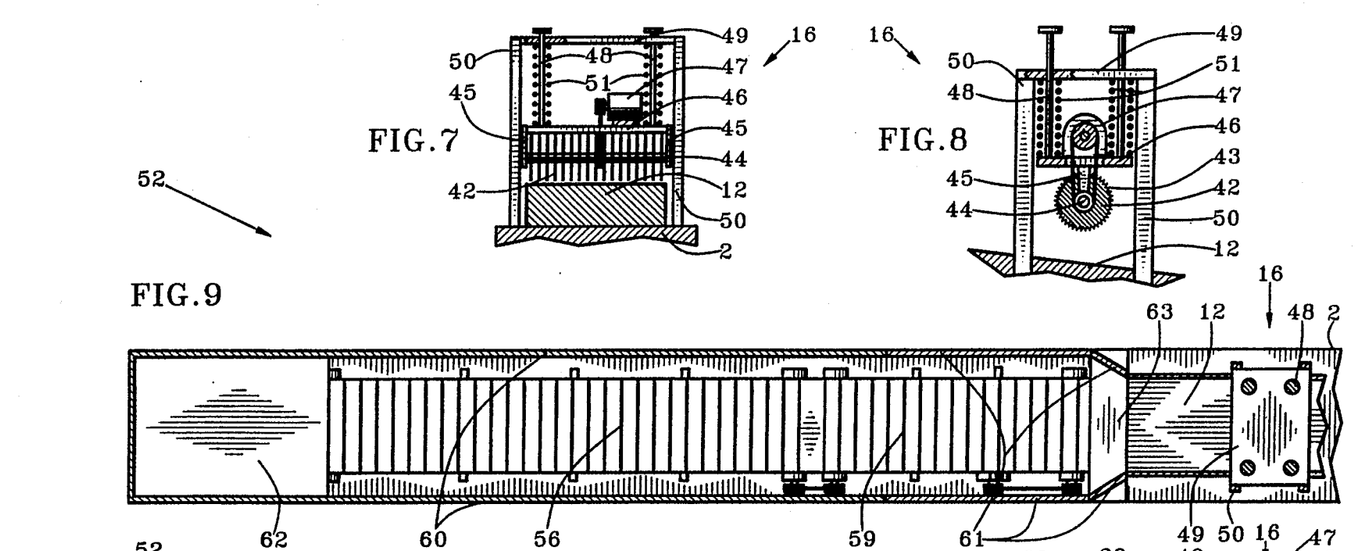
FIG. 7 is a front elevation view of a bag cutter employed at a receiving portion of the invention.
FIG. 8 is a side elevation view of the bag cutter in a raised mode to accept large bags, large items and large quantities of waste items.
FIG. 9 is a top view of a vehicular refuse bin having a receiving conveyor in waste conveyance relationship between the vehicular refuse bin and a vibratory waste feeder.

Reference is made now to FIGS. 7 and 8 primarily and to FIGS. 1, 2, 5, 6, 9 and 10 in relation to the bag cutter 16. A plurality of bag cutter wheels 42 with cutting serrations 43 as desired can be positioned tandem on a cutter axle 44 that is positioned laterally between axle housings 45 at sides of the feeder 12. The axle housings 45 are attachable to a motor platform 46 on which a cutter motor 47 is positioned to rotate the cutter axle 44 through appropriate transmission means. The motor platform 46 is attached to platform rods 48 which are extended through a cutter base 49 that is positioned on cutter pillars 50 that are extended up from the solid waste processing platform 2. Cutter springs 51 are employed to maintain a cutting tension between the cutter base 49 and the motor platform 46. The cutter motor 47 can be rotated in which ever direction desired. Thus bags of garbage on the refuse feeder 12 can be cut open and various items of refuse can be cut lightly for ease of dispersement of refuse on the solid waste feeder 12. The bag cutter wheels 42 can be raised in opposition to cutter springs 51 as shown in FIG. 8 by large bags to be cut open and by large objects moving downwardly on the vibrator or other form of solid waste dispenser 12.

Figure 10:
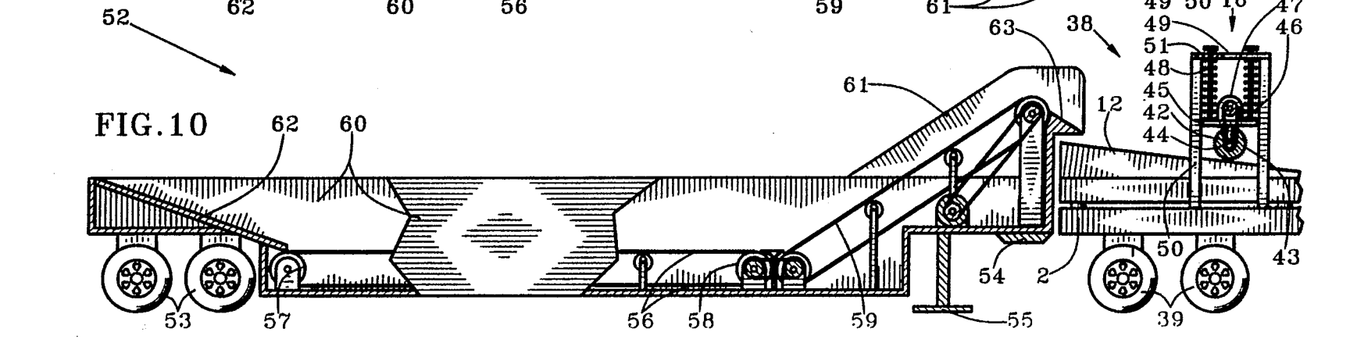
FIG. 10 is a cutaway side elevation view of the FIG. 9 illustration.

Referring to FIGS. 9 and 10, the solid waste receiving means can be a refuse bin 52 that is positioned aft of the solid waste processing platform 2. Wheels 53, fifth wheel 54 and leveling jack 55 can be attached to make the refuse bin 52 mobile like a semitrailer. Refuse bin 52, with or without wheels 53, fifth wheel 54 and leveling jack 55 to make it mobile like a semitrailer, can be used in conjunction with either a single vehicular unit 38 as described in relation to FIGS. 5 and 6 or with a multiple vehicular unit as described in relation to FIGS. 1-4.

The refuse bin 52 can be provided with a bin conveyor belt 56 in conveyance relationship between an aft conveyor pulley 57 and a forward conveyor pulley 58. A receiving belt 59 is positioned in waste conveyance relationship between the forward conveyor pulley 58, the refuse bin 52 and the solid waste feeder 12 on the solid waste processing platform 2. Bin walls 60 and belt walls 61 can be provided to contain refuse. A rear slant bed 62 and a front slant platform 63 can be employed to aid flow of refuse in areas where there are no other conveyance means.

Figure 11:
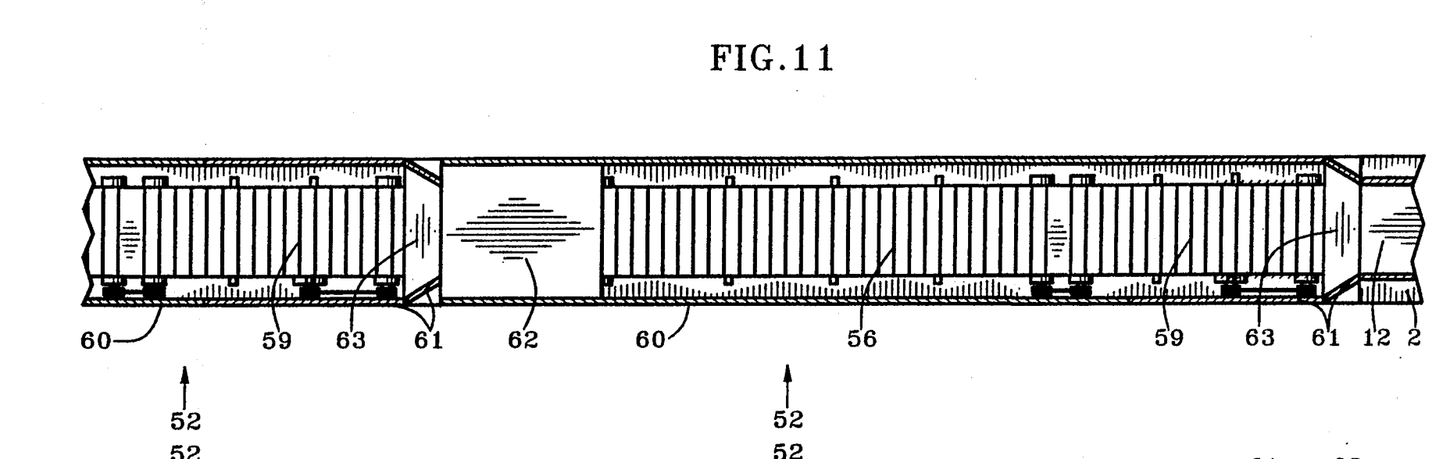
FIG. 11 is a top view of a successive end to end positioning of vehicular refuse bins for transfer of solid wastes to a receiving end of this invention.
Figure 12:
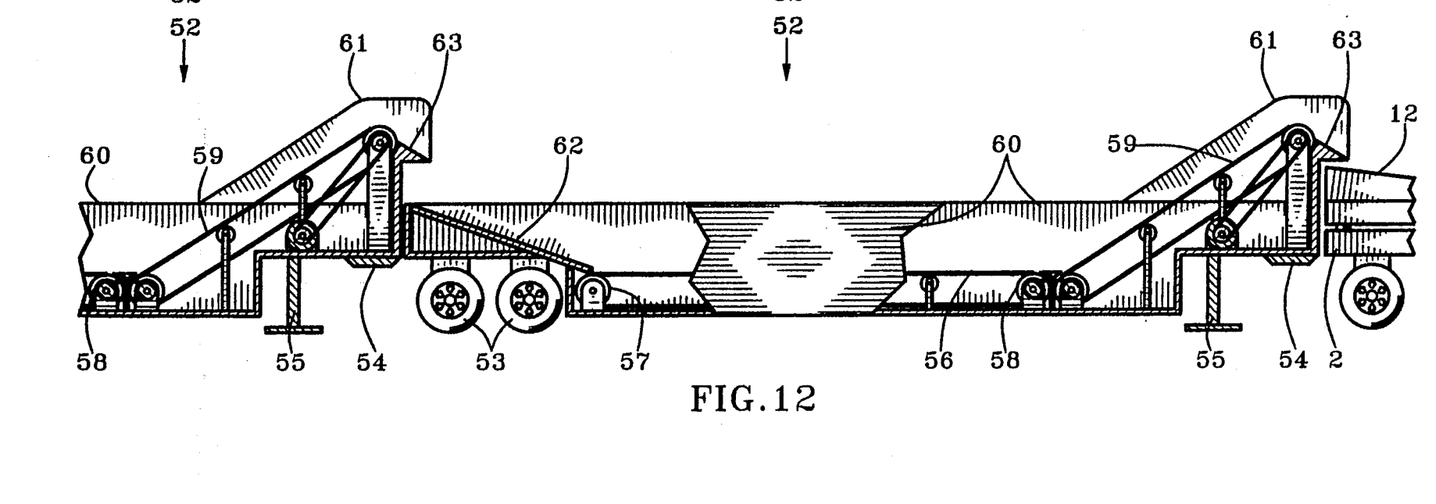
FIG. 12 is a cutaway side elevation view of the FIG. 11 illustration.

Referring to FIGS. 11 and 12, a plurality of refuse bins 52 can be positioned consecutively end to end in refuse conveyance relationship to a feeder 12 on a solid waste processing platform 2. This reduces waiting time of garbage trucks and other refuse supply means during peak periods. It compensates for erratic delivery of waste for processing. Full-time, 24 hour, multiple shift operation is made possible. This decreases operational costs greatly. Refuse bins more distant from a solid waste processing platform 2 are caused to deliver refuse to closer refuse bins in the same manner as to the refuse feeder 12.

Figure 13:
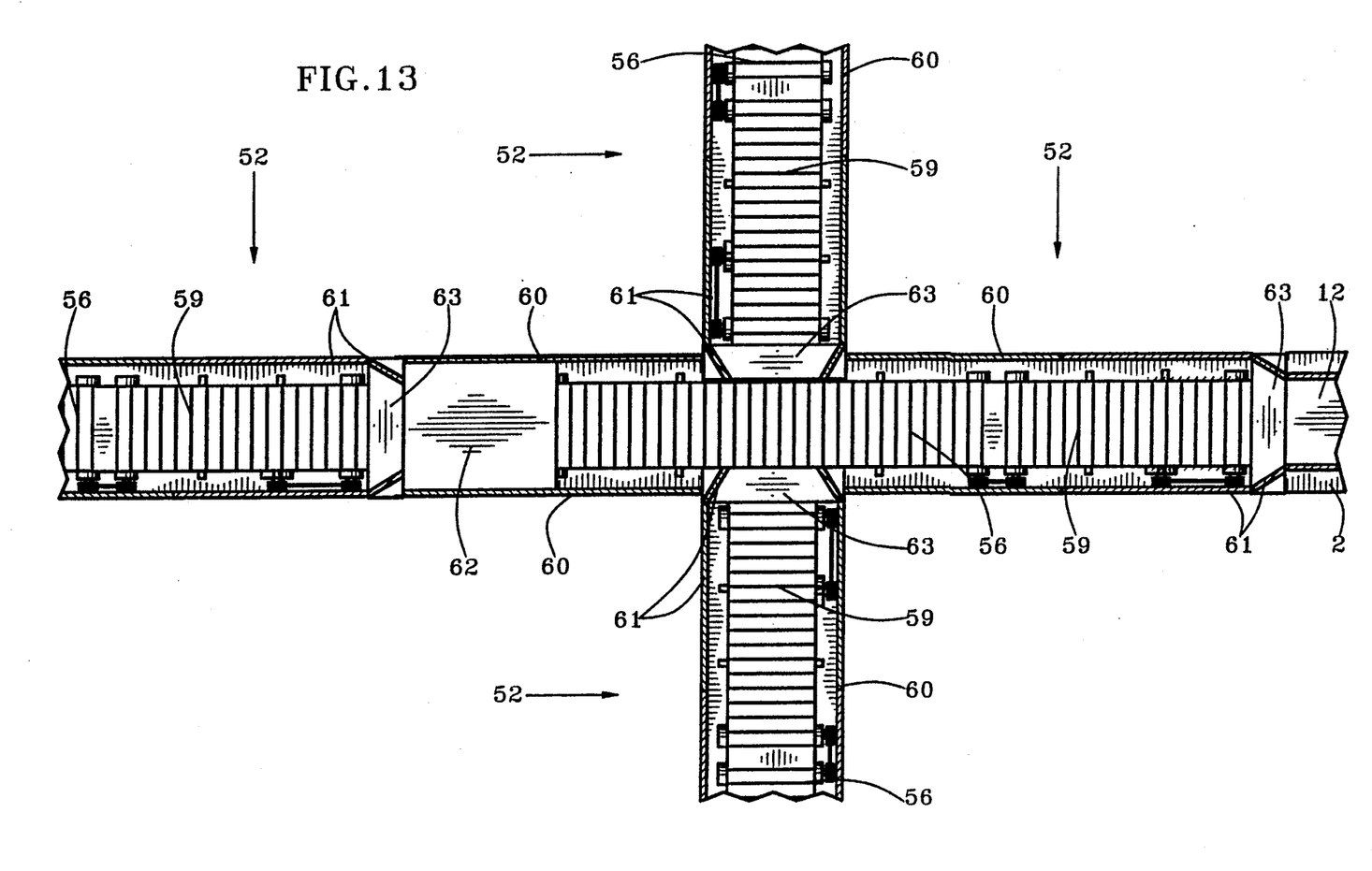
FIG. 13 is a top view of a combination of end to end and side delivery positioning of vehicular refuse bins for conveyance of refuse to a receiving end of this invention.

Referring to FIG. 13, refuse bins 52 can be positioned for side delivery into other refuse bins 52 in addition to being lined up for end to end delivery. This is accomplished by positioning front slant platforms 63 of perpendicularly positioned refuse bins 52 over bin walls 60 of refuse bins 52 into which refuse is side delivered. This further streamlines operations. It can prevent any dumping of unprocessed waste on the ground for double handling. A large operation is possible without contamination of land with unprocessed waste.

Figures 14, 15:
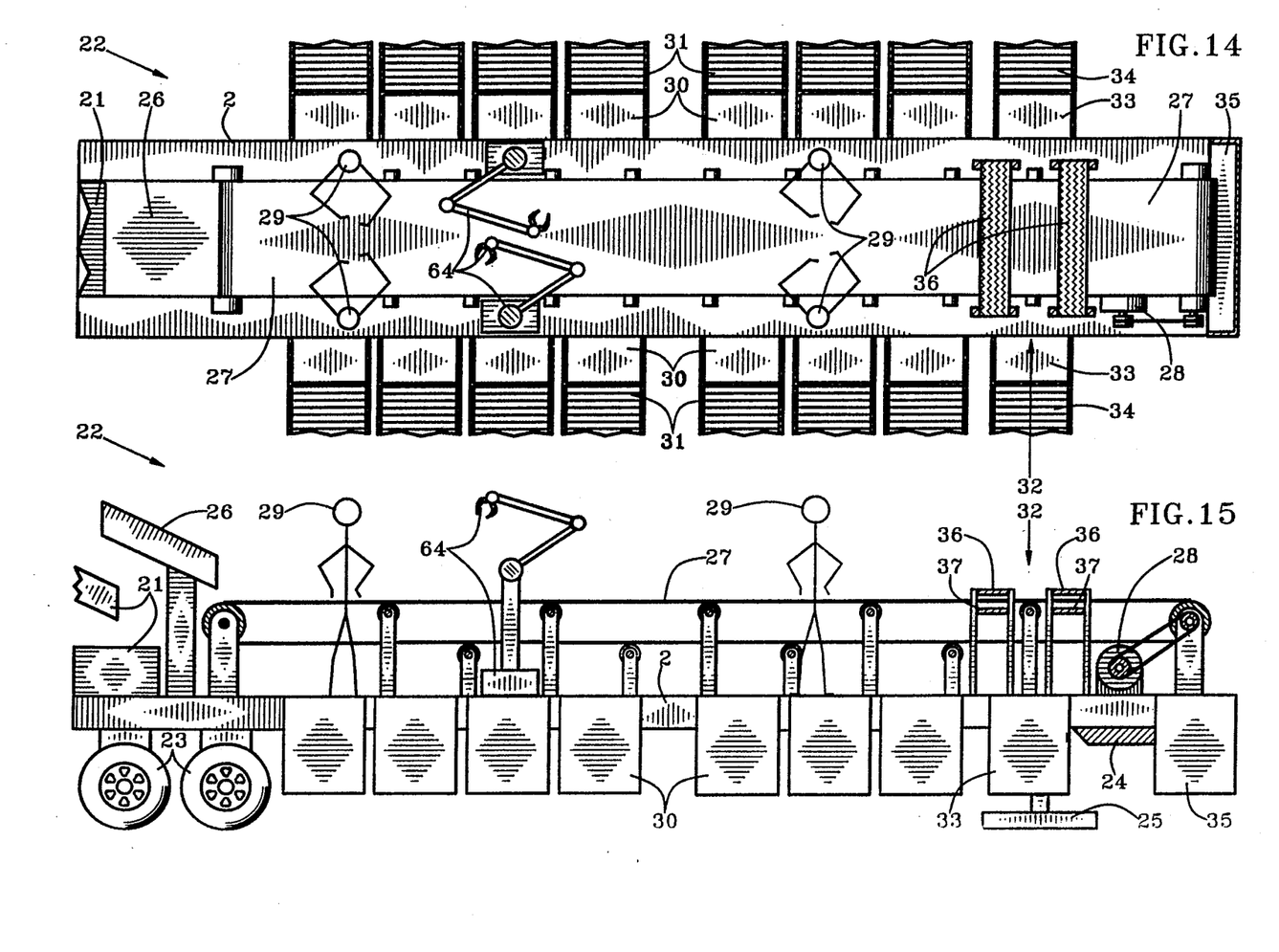
FIG. 14 is a top view of a processing section in which robotic sorting means are employed solely or optionally in combination with individuals for processing municipal solid waste.
FIG. 15 is a side elevation view of the FIG. 14 illustration.

Referring to FIGS. 14 and 15, the solid waste sorting means can be at least one robotic machine 64. The at least one robotic machine 64 can be used solely and independently of or in addition to sorting workers 29. Robotic machines 64 can be most suitable for sorting particular types of waste while leaving other types for human sorting. Robotic machines can also be operated by or guided by humans to varying degrees, depending on the nature of the robotic machines 64 and on the nature of the refuse being sorted. Some robotic machines 64 will be able to accomplish all of the sorting fast and efficiently. Others will be able to accomplish most of it while leaving only minor parts for human sorting. Other robotic machines 64 will be able to accomplish only small but likely heavier portions of sorting. Robotic machines 64 will be as different with development and cost as sorting workers 29 are according to their experience and the cost of achieving higher levels of sorting efficiency.

This invention, therefore, has dynamic utility in a variety of ways. It is moveable as a mobile unit or combination of units. It is versatile for different types of solid waste. It is adaptable to different landfill and dump site conditions. It can be used to prevent any dumping of unprocessed waste and, therefore, to prevent the occurrence of garbage dumps. It is adaptable to increased efficiency of mechanical and human sorting means. It is efficient in use of time of workers and time of the general public in handling their wastes. It eliminates the need for the general public to sort and, in many cases, even to bag their garbage. It is efficient also in the use of not only processing equipment but also in the use of garbage trucks.

Various modifications may be made of the invention without departing from the scope thereof and it is desired, therefore, that only such limitations shall be placed thereon as are imposed by the prior art and which are set forth in the appended claims.

What is claimed is:

1. A dynamic landfill recycling apparatus comprising:
   at least one solid waste processing platform having an aft end,
   wheel means attached to the solid waste processing platform for mobility purposes,
   solid waste receiving means located proximate to the aft end of the solid waste processing platform,
   the solid waste processing platform comprising a plurality of vehicular units with a front end of a first vehicular unit abutting an aft end of a second vehicular unit and the solid waste receiving means being positioned proximate the aft end of the first vehicular unit such that the first vehicular unit and at least one additional vehicular unit in end to end relationship comprise the solid waste processing platform in vehicular unit sections,
   a solid waste receiving conveyor positioned forwardly on the solid waste processing platform from the solid waste receiving means in solid waste conveyance relationship to solid waste deposited on the solid waste receiving means,
   a solid waste feeder positioned forwardly on the solid waste processing platform from the solid waste receiving conveyor in solid waste dispersive relationship to solid waste deposited on the solid waste feeder,
   a bag cutter positioned intermediate the solid waste feeder in bag cutting relationship to bags of solid waste on the solid waste feeder,
   a ferrous material separator having a ferromagnet positioned forwardly on the solid waste processing platform from the solid waste feeder in magnetic-separation relationship to ferrous material deposited on the ferrous material separator,
   a recycling conveyor positioned forwardly on the solid waste processing platform from the ferrous material separator in conveyance relationship to solid waste remaining after separation of ferrous materials, and
   a solid waste sorting means positioned laterally to the recycling conveyor on the solid waste processing platform in solid waste sorting relationship to solid waste on the recycling conveyor.

2. A dynamic landfill recycling apparatus as described in claim 1 wherein the solid waste receiving means is comprised of a dump bed having a dump end mounted pivotally to the solid waste processing platform proximate a receiving end of the solid waste receiving conveyor and further comprising:
   a mechanical lifter in dump lift relationship between a lift end of the dump bed and the solid waste processing platform.

3. A dynamic landfill recycling apparatus as described in claim 1 wherein the solid waste receiving conveyor is a conveyor belt slanted at a desired angle upwardly and rotated by a motor at a sufficient speed to throw solid waste arcuately onto the solid waste feeder in a manner that aids dispersion of the solid waste on the solid waste feeder.

4. A dynamic landfill recycling apparatus as described in claim 1 wherein the solid waste feeder is a vibrator bed slanted at a desired angle downwardly and vibrated in a manner to cause solid waste to fall downhill from a top end of the vibrator bed to a bottom end of the vibrator bed.

5. A dynamic landfill recycling apparatus as described in claim 1 wherein the bag cutter is comprised of at least one series of tandem cutter disks on a disk axle that is mounted rotationally to a cutter housing that is slidable vertically in response to vertical resilience pressure such that outside diameter edges of the tandem cutter disks are maintained in snug contact with bags of solid waste on the solid waste feeder.

6. A dynamic landfill recycling apparatus as described in claim 5 and further comprising:
   a bag cutter motor attached to the cutter housing and having a rotary transmission means in rotational relationship between a rotational shaft of the bag cutter motor and the disk axle,
   the bag cutter motor being rotational in a desired direction of rotation.

7. A dynamic landfill recycling apparatus as described in claim 6 and further comprising:
   cutter serrations on the cutter disks.

8. A dynamic landfill recycling apparatus as described in claim 1 wherein the ferrous material separator is an upwardly slanted conveyor belt which rotates on a top pulley wheel that is cylindrical and magnetic to attract ferrous materials and allow them to fall into a ferrous material receptacle as a bottom surface of the conveyor belt is disengaged from the top pulley wheel to travel towards a bottom pulley wheel.

9. A dynamic landfill recycling apparatus as described in claim 8 wherein the upwardly slanted conveyor belt is slanted at an appropriate angle and rotated by a motor at a sufficient speed to throw non-ferrous solid waste arcuately onto the recycling conveyor in a manner that further aids dispersion of the solid waste for sorting on the recycling conveyor.

10. A dynamic landfill recycling apparatus as described in claim 1 wherein the recycling conveyor is a conveyor belt.

11. A dynamic landfill recycling apparatus as described in claim 10 wherein the solid waste sorting means is a section of platform at each side of the conveyor belt that is sized and shaped to allow at least one person to be positioned for hand sorting non-ferrous materials on the recycling conveyor belt and further comprising:
at least one sorting receptacle on each side of the recycling conveyor belt to receive sorted solid waste for recycling and landfill distribution as desired.

12. A dynamic landfill recycling apparatus as described in claim 10 wherein the solid waste sorting means is at least one robotic machine which is constructed to detect characteristics of non-ferrous materials on the recycling conveyor belt and to place the non-ferrous materials in at least one sorting receptacle on each side of the recycling conveyor belt in order to sort solid waste for recycling and landfill distribution as desired.

13. A dynamic landfill recycling apparatus as described in claim 10 wherein the solid waste sorting means is at least one robotic machine for which an individual can detect characteristics of non-ferrous materials on the recycling conveyor belt for the at least one robotic machine to place the non-ferrous materials in at least one sorting receptacle on each side of the recycling conveyor belt in order to sort solid waste for recycling and landfill distribution as desired.

14. A dynamic landfill recycling apparatus as described in claim 10 wherein the solid waste sorting means is a desired combination of individuals and robotic machines which can detect characteristics of non-ferrous materials on the recycling conveyor belt and place the non-ferrous materials in at least one sorting receptacle on each side of the recycling conveyor belt in order to sort solid waste for recycling and landfill distribution as desired.

15. A dynamic landfill recycling apparatus as described in claim 1 wherein the solid waste sorting means includes a means for detecting and removing separately as desired from the solid waste on the recycling conveyor paper in desired types, glass in desired colors, plastic of desired types, aluminum, organic wastes, and landfill wastes.

16. A dynamic landfill recycling apparatus as described in claim 1 and further comprising:
an aluminum separator positioned proximate a terminal end of the recycling conveyor.

17. A dynamic landfill recycling system as described in claim 16 wherein the aluminum separator is comprised of:
at least one top magnet positioned vertically above the recycling conveyor and having magnetic polarity in a direction towards either side of the recycling conveyor, and
at least one bottom magnet positioned vertically below the recycling conveyor and having magnetic polarity in a direction opposite to polarity of the at least one top magnet.

18. A dynamic landfill recycling apparatus as described in claim 1 wherein the solid waste receiving means is comprised of a refuse bin positioned aft of the at least one solid waste processing platform and having a conveyor belt on a bottom portion of the refuse bin in waste conveyance relationship from an aft end of the refuse bin to a front end of the refuse bin and wherein the solid waste receiving conveyor is extendible from the aft end of the at least one solid waste processing platform into the refuse bin in waste transfer relationship between the refuse bin and the solid waste feeder.

19. A dynamic landfill recycling apparatus as described in claim 1 wherein the solid waste receiving means is comprised of a refuse bin on a platform to which wheels are attachable separately and further comprising:
a conveyor belt on a bottom portion of the refuse bin in waste conveyance relationship from an aft end of the refuse bin to a front end of the refuse bin, and
the solid waste receiving conveyor is extendible from the front end of the refuse bin in waste transfer relationship between the refuse bin and the solid waste feeder.

20. A dynamic landfill recycling system as described in claim 19 and further comprising:
a plurality of refuse bins in successive conveyance relationship to the solid waste feeder.

21. A dynamic landfill recycling apparatus comprising:
at least one solid waste processing platform having an aft end,
wheel means attached to the solid waste processing platform for mobility purposes,
the solid waste processing platform comprising a plurality of vehicular units with a front end of a first vehicular unit abutting an aft end of a second vehicular unit,
solid waste receiving means located proximate to the aft end of the solid waste processing platform,
the solid waste receiving means being positioned proximate the aft end of the first vehicular unit such that the first vehicular unit and at least one additional vehicular unit in end to end relationship comprise the solid waste processing platform in vehicular unit sections,
a mechanical lifter in dump lift relationship between a lift end of the solid waste receiving means and the solid waste processing platform,
a solid waste receiving conveyor positioned forwardly on the solid waste processing platform from the solid waste receiving means in solid waste conveyance relationship to solid waste deposited on the solid waste receiving means,
the solid waste receiving means comprising a dump bed having a dump end mounted pivotally to the solid waste processing platform proximate a receiving end of the solid waste receiving conveyor,
a solid waste feeder positioned forwardly on the solid waste processing platform from the solid waste receiving conveyor in solid waste dispersive relationship to solid waste deposited on the solid waste feeder,
the solid waste receiving conveyor comprising a conveyor belt slanted at a desired angle upwardly and rotated by a motor at a sufficient speed to throw solid waste arcuately onto the solid waste feeder in a manner that aids dispersion of the solid waste on the solid waste feeder,
the solid waste feeder comprising of a vibrator bed slanted at a desired angle downwardly and vibrated in a manner to cause solid waste to fall downhill from a top end of the vibrator bed to a bottom end of the vibrator bed,
a bag cutter positioned intermediate the solid waste feeder in bag cutting relationship to bags of solid waste on the solid waste feeder, said bag cutter comprising of at least one series of tandem cutter disks on a disk axle that is mounted rotationally to a cutter housing that is slidable vertically in response to vertical resilience pressure such that outside diameter edges of the tandem cutter disks are maintained in snug contact with bags of solid waste on the solid waste feeder, the cutter disks having cutter serrations to effect cutting action, a bag cutter motor attached to the cutter housing and having a rotary transmission means in rotational relationship between a rotational shaft of the bag cutter motor and the disk axle, the bag cutter motor being rotational in a desired direction of rotation, a ferrous material separator having a ferromagnet positioned forwardly on the solid waste processing platform from the solid waste feeder in magnetic-separation relationship to ferrous material deposited on the ferrous material separator, the ferrous material separator comprising an upwardly slanted conveyor belt which rotates on a top pulley wheel that is cylindrical and magnetic to attract ferrous materials and allow them to fall into a ferrous material receptacle as a bottom surface of the conveyor belt is disengaged from the top pulley wheel to travel towards a bottom pulley wheel, the upwardly slanted conveyor belt is slanted at an appropriate angle and rotated by a motor at a sufficient speed to throw non-ferrous solid waste arcuately onto the recycling conveyor in a manner that further aids dispersion of the solid waste for sorting on the recycling conveyor, a recycling conveyor means positioned forwardly on the solid waste processing platform from the ferrous material separator in conveyance relationship to solid waste remaining after separation of ferrous materials, and a solid waste sorting means positioned laterally to the recycling conveyor on the solid waste processing platform in solid waste sorting relationship to solid waste on the recycling conveyor.

22. A dynamic landfill recycling apparatus as described in claim 21 wherein the solid waste sorting means is a section of platform at each side of the conveyor belt that is sized and shaped to allow at least one person to be positioned for hand sorting non-ferrous materials on the recycling conveyor belt and further comprising:

at least one sorting and conveyance receptacle on each side of the recycling conveyor belt to receive sorted solid waste for recycling and landfill distribution as desired.

23. A dynamic landfill recycling apparatus as described in claim 22 wherein the solid waste sorting means is at least one robotic machine which is constructed to detect characteristics of non-ferrous materials on the recycling conveyor belt from the section of platform at each side of the conveyor belt and to place the non-ferrous materials in at least one sorting receptacle on each side of the recycling conveyor belt in order to sort solid waste for recycling and landfill distribution as desired.

24. A dynamic landfill recycling apparatus as described in claim 21 wherein the solid waste sorting means is at least; one robotic machine for which an individual can detect characteristics of non-ferrous materials on the recycling conveyor belt for the at least one robotic machine to place the non-ferrous materials in at least one sorting and conveyance receptacle on each side of the recycling conveyor belt in order to sort solid waste for recycling and landfill distribution as desired.

25. A dynamic landfill recycling apparatus as described in claim 21 wherein the solid waste sorting means is a desired combination of individuals and robotic machines which can detect characteristics of non-ferrous materials on the recycling conveyor belt and place the non-ferrous materials in at least one sorting and conveyance receptacle on each side of the recycling conveyor belt in order to sort solid waste for recycling and landfill distribution as desired.

26. A dynamic landfill recycling apparatus as described in claim 21 wherein the solid waste sorting means includes a means for detecting and removing separately as desired from the solid waste on the recycling conveyor paper in desired types, glass in desired colors, plastic of desired types, aluminum, organic wastes, and landfill wastes.

27. A dynamic landfill recycling apparatus as described in claim 21 and further comprising:

an aluminum separator positioned proximate a terminal end of the recycling conveyor.

28. A dynamic landfill recycling system as described in claim 27 wherein the aluminum separator is comprised of:

at least one top magnet positioned vertically above the recycling conveyor and having magnetic polarity in a direction towards either side of the recycling conveyor, and at least one bottom magnet positioned vertically below the recycling conveyor and having magnetic polarity in a direction opposite to polarity of the at least one top magnet.

29. A dynamic landfill recycling apparatus comprising:

at least one solid waste processing platform having an aft end, wheel means attached to the solid waste processing platform for mobility purposes, solid waste receiving means located proximate to the aft end of the solid waste processing platform, a solid waste receiving conveyor positioned forwardly on the solid waste processing platform from the solid waste receiving means in solid waste conveyance relationship to solid waste deposited on the solid waste receiving means, a solid waste feeder positioned forwardly on the solid waste processing platform from the solid waste receiving conveyor in solid waste dispersive relationship to solid waste deposited on the solid waste feeder, a bag cutter positioned intermediate the solid waste feeder in bag cutting relationship to bags of solid waste on the solid waste feeder, a ferrous material separator having a ferromagnet positioned forwardly on the solid waste processing platform from the solid waste feeder in magnetic-separation relationship to ferrous material deposited on the ferrous material separator, a recycling conveyor positioned forwardly on the solid waste processing platform from the ferrous material separator in conveyance relationship to solid waste remaining after separation of ferrous materials, a solid waste sorting means positioned laterally to the recycling conveyor on the solid waste processing platform in solid waste sorting relationship to solid waste on the recycling conveyor, an aluminum separator positioned proximate a terminal end of the recycling conveyor, the aluminum separator comprising at least one top magnet positioned vertically above the recycling conveyor and having magnetic polarity in a direction towards either side of the recycling conveyor, and at least one bottom magnet positioned vertically below the recycling conveyor and having magnetic polarity in a direction opposite to polarity of the at least one top magnet.

30. A dynamic landfill recycling apparatus comprising:

at least one solid waste processing platform having an aft end and being a single vehicular unit structure, wheel means attached to the solid waste processing platform for mobility purposes, solid waste receiving means located proximate to the aft end of the solid waste processing platform, a solid waste receiving conveyor positioned forwardly on the at least one solid waste processing platform from the solid waste receiving means in solid waste conveyance relationship to solid waste deposited on the solid waste receiving means, the solid waste receiving means comprising of a dump bed having a dump end mounted pivotally to the solid waste processing platform proximate a receiving end of the solid waste receiving conveyor, a mechanical lifter in dump lift relationship between a lift end of the dump bed and the solid waste processing platform, a solid waste feeder positioned forwardly on the at least one solid waste processing platform from the solid waste receiving conveyor in solid waste dispersive relationship to solid waste deposited on the solid waste feeder, the solid waste receiving conveyor comprising a conveyor belt slanted at a desired angle upwardly and rotated by a motor at a sufficient speed to throw solid waste arcuately onto the solid waste feeder in a manner that aids dispersion of the solid waste on the solid waste feeder, the solid waste feeder comprising a vibrator bed slanted at a desired angle downwardly and vibrated in a manner to cause solid waste to fall downhill from a top end of the vibrator bed to a bottom end of the vibrator bed, a bag cutter positioned intermediate the solid waste feeder in bag cutting relationship to bags of solid waste on the solid waste feeder, the bag cutter comprising at least one series of tandem cutter disks on a disk axle that is mounted rotationally to a cutter housing that is slidable vertically in response to vertical resilience pressure such that outside diameter edges of the tandem cutter disks are maintained in snug contact with bags of solid waste on the solid waste feeder, a bag cutter motor attached to the cutter housing and having a rotary transmission means in rotational relationship between a rotational shaft of the bag cutter motor and the disk axle, the bag cutter motor being rotational in a desired direction of rotation, cutter serrations on the cutter disks, a ferrous material separator having a ferromagnet positioned forwardly on the solid waste processing platform from the solid waste feeder in magnetic-separation relationship to ferrous material deposited on the ferrous material separator, the ferrous material separator comprising of an upwardly slanted conveyor belt which rotates on a top pulley wheel that is cylindrical and magnetic to attract ferrous materials and allow them to fall into a ferrous material receptacle as a bottom surface of the conveyor belt is disengaged from the top pulley wheel to travel towards a bottom pulley wheel, a recycling conveyor means positioned forwardly on the at least one solid waste processing platform from the ferrous material separator in conveyance relationship to solid waste remaining after separation of ferrous materials, the upwardly slanted conveyor belt is slanted at an appropriate angle and rotated by a motor at a sufficient speed to throw non-ferrous solid waste arcuately onto the recycling conveyor in a manner that further aids dispersion of the solid waste for sorting on the recycling conveyor, and a solid waste sorting means positioned laterally to the recycling conveyor on the at least one solid waste processing platform in solid waste sorting relationship to solid waste on the recycling conveyor.

31. A dynamic landfill recycling apparatus as described in claim 30 wherein the solid waste sorting means is a section of platform at each side of the conveyor belt that is sized and shaped to allow at least one person to be positioned for hand sorting non-ferrous materials on the recycling conveyor belt and further comprising:

at least one sorting and conveyance receptacle on each side of the recycling conveyor belt to receive sorted solid waste for recycling and landfill distribution as desired.

32. A dynamic landfill recycling apparatus as described in claim 30 wherein the solid waste sorting means is at least one robotic machine which is constructed to detect characteristics of non-ferrous materials on the recycling conveyor belt from the section of platform at each side of the conveyor belt and to place the non-ferrous materials in at least one sorting receptacle on each side of the recycling conveyor belt in order to sort solid waste for recycling and landfill distribution as desired.

33. A dynamic landfill recycling apparatus as described in claim 30 wherein the solid waste sorting means is at least one robotic machine for which an individual can detect characteristics of non-ferrous materials on the recycling conveyor belt for the at least one robotic machine to place the non-ferrous materials in at least one sorting and conveyance receptacle on each side of the recycling conveyor belt in order to sort solid waste for recycling and landfill distribution as desired.

34. A dynamic landfill recycling apparatus as described in claim 30 wherein the solid waste sorting means is a desired combination of individuals and robotic machines which can detect characteristics of non-ferrous materials on the recycling conveyor belt and place the non-ferrous materials in at least one sorting and conveyance receptacle on each side of the recycling conveyor belt in order to sort solid waste for recycling and landfill distribution as desired.

35. A dynamic landfill recycling apparatus as described in claim 34 wherein the solid waste sorting means includes a means for detecting and removing separately as desired from the solid waste on the recycling conveyor paper in desired types, glass in desired colors, plastic of desired types, aluminum, organic wastes, and landfill wastes.

36. A dynamic landfill recycling apparatus as described in claim 30 and further comprising:
an aluminum separator positioned proximate a terminal end of the recycling conveyor and having at least one magnet in magnetic repulsion relationship to aluminum items on the recycling conveyor.

37. A dynamic landfill recycling system as described in claim 36 wherein the aluminum separator is comprised of:
at least one top magnet positioned vertically above the recycling conveyor and having magnetic polarity in a direction towards either side of the recycling conveyor, and
at least one bottom magnet positioned vertically below the recycling conveyor and having magnetic polarity in a direction opposite to polarity of the at least one top magnet.

38. A dynamic landfill recycling apparatus comprising:
at least one solid waste processing platform having an aft end,
wheel means attached to the solid waste processing platform for mobility purposes,
the solid waste processing platform comprising a single vehicular unit,
solid waste receiving means located proximate to the aft end of the solid waste processing platform,
a solid waste receiving conveyor positioned forwardly on the solid waste processing platform from the solid waste receiving means in solid waste conveyance relationship to solid waste deposited on the solid waste receiving means,
a solid waste feeder positioned forwardly on the solid waste processing platform from the solid waste receiving conveyor in solid waste dispersive relationship to solid waste deposited on the solid waste feeder,
a bag cutter positioned intermediate the solid waste feeder in bag cutting relationship to bags of solid waste on the solid waste feeder, the bag cutter being comprised of at least one series of tandem cutter disks on a disk axle that is mounted rotationally to a cutter housing that is slidable vertically in response to vertical resilience pressure such that outside diameter edges of the tandem cutter disks are maintained in snug contact with bags of solid waste on the solid waste feeder,
a ferrous material separator having a ferromagnet positioned forwardly on the solid waste processing platform from the solid waste feeder in magnetic-separation relationship to ferrous material deposited on the ferrous material separator,
a recycling conveyor positioned forwardly on the solid waste processing platform from the ferrous material separator in conveyance relationship to solid waste remaining after separation of ferrous materials, and
a solid waste sorting means positioned laterally to the recycling conveyor on the solid waste processing platform in solid waste sorting relationship to solid waste on the recycling conveyor.

39. A dynamic landfill recycling apparatus as described in claim 38 and further comprising:
a bag cutter motor attached to the cutter housing and having a rotary transmission means in rotational relationship between a rotational shaft of the bag cutter motor and the disk axle,
the bag cutter motor being rotational in a desired direction of rotation.

40. A dynamic landfill recycling apparatus as described in claim 39 and further comprising:
cutter serrations on the cutter disks.

41. A dynamic landfill recycling apparatus comprising:
at least one solid waste processing platform having an aft end,
wheel means attached to the solid waste processing platform for mobility purposes,
the solid waste processing platform comprising a single vehicular unit,
solid waste receiving means located proximate to the aft end of the solid waste processing platform,
a solid waste receiving conveyor positioned forwardly on the solid waste processing platform from the solid waste receiving means in solid waste conveyance relationship to solid waste deposited on the solid waste receiving means,
a solid waste feeder positioned forwardly on the solid waste processing platform from the solid waste receiving conveyor in solid waste dispersive relationship to solid waste deposited on the solid waste feeder,
a bag cutter positioned intermediate the solid waste feeder in bag cutting relationship to bags of solid waste on the solid waste feeder,
a ferrous material separator having a ferromagnet positioned forwardly on the solid waste processing platform from the solid waste feeder in magnetic-separation relationship to ferrous material deposited on the ferrous material separator,
a recycling conveyor positioned forwardly on the solid waste processing platform from the ferrous material separator in conveyance relationship to solid waste remaining after separation of ferrous materials, the recycling conveyor being a conveyor belt, and
a solid waste sorting means positioned laterally to the recycling conveyor on the solid waste processing platform in solid waste sorting relationship to solid waste on the recycling conveyor.

42. A dynamic landfill recycling apparatus as described in claim 41 wherein the solid waste sorting means is a section of platform at each side of the conveyor belt that is sized and shaped to allow at least one person to be positioned for hand sorting non-ferrous materials on the recycling conveyor belt and further comprising:
at least one sorting receptacle on each side of the recycling conveyor belt to receive sorted solid waste for recycling and landfill distribution as desired.

43. A dynamic landfill recycling apparatus as described in claim 41 wherein the solid waste sorting means is at least one robotic machine which is constructed to detect characteristics of non-ferrous materials on the recycling conveyor belt from the section of platform at each side of the conveyor belt and to place the non-ferrous materials in at least one sorting receptacle on each side of the recycling conveyor belt in order to sort solid waste for recycling and landfill distribution as desired.

44. A dynamic landfill recycling apparatus as described in claim 41 wherein the solid waste sorting means is at least one robotic machine for which an individual can detect characteristics of non-ferrous materials on the recycling conveyor belt for the at least one robotic machine to place the non-ferrous materials in at least one sorting receptacle on each side of the recycling conveyor belt in order to sort solid waste for recycling and landfill distribution as desired.

45. A dynamic landfill recycling apparatus as described in claim 41 wherein the solid waste sorting means is a desired combination of individuals and robotic machines which can detect characteristics of non-ferrous materials on the recycling conveyor belt and place the non-ferrous materials in at least one sorting receptacle on each side of the recycling conveyor belt in order to sort solid waste for recycling and landfill distribution as desired.

46. A dynamic landfill recycling apparatus comprising:
   at least one solid waste processing platform having an aft end,
   wheel means attached to the solid waste processing platform for mobility purposes,
   the solid waste processing platform comprising a single vehicular unit,
   solid waste receiving means located proximate to the aft end of the solid waste processing platform,
   a solid waste receiving conveyor positioned forwardly on the solid waste processing platform from the solid waste receiving means in solid waste conveyance relationship to solid waste deposited on the solid waste receiving means,
   a solid waste feeder positioned forwardly on the solid waste processing platform from the solid waste receiving conveyor in solid waste dispersive relationship to solid waste deposited on the solid waste feeder,
   a bag cutter positioned intermediate the solid waste feeder in bag cutting relationship to bags of solid waste on the solid waste feeder,
   a ferrous material separator having a ferromagnet positioned forwardly on the solid waste processing platform from the solid waste feeder in magnetic-separation relationship to ferrous material deposited on the ferrous material separator,
   a recycling conveyor positioned forwardly on the solid waste processing platform from the ferrous material separator in conveyance relationship to solid waste remaining after separation of ferrous materials,
   a solid waste sorting means positioned laterally to the recycling conveyor on the solid waste processing platform in solid waste sorting relationship to solid waste on the recycling conveyor,
   an aluminum separator positioned proximate a terminal end of the recycling conveyor,
   the aluminum separator comprising:
      at least one top magnet positioned vertically above the recycling conveyor and having magnetic plurality in a direction towards either side of the recycling conveyor, and
      at least one bottom magnet positioned vertically below the recycling conveyor and having magnetic plurality in a direction opposite to the plurality of the at least one top magnet.

* * * * *